(12) United States Patent
Konishi et al.

(10) Patent No.: US 12,235,158 B2
(45) Date of Patent: Feb. 25, 2025

(54) OPTICAL SIGNAL DETECTION SYSTEM, OPTICAL SIGNAL DETECTION DEVICE, AND OPTICAL SIGNAL DETECTION METHOD

(71) Applicant: OSAKA UNIVERSITY, Osaka (JP)

(72) Inventors: Tsuyoshi Konishi, Osaka (JP); Ryohei Kamikawa, Osaka (JP); Yu Yamasaki, Osaka (JP)

(73) Assignee: OSAKA UNIVERSITY, Osaka (JP)

( * ) Notice: Subject to any disclaimer, the term of this patent is extended or adjusted under 35 U.S.C. 154(b) by 231 days.

(21) Appl. No.: 18/008,257

(22) PCT Filed: Jun. 22, 2021

(86) PCT No.: PCT/JP2021/023553
§ 371 (c)(1),
(2) Date: Dec. 5, 2022

(87) PCT Pub. No.: WO2021/261476
PCT Pub. Date: Dec. 30, 2021

(65) Prior Publication Data
US 2023/0213384 A1 Jul. 6, 2023

(30) Foreign Application Priority Data
Jun. 23, 2020 (JP) .................. 2020-108229

(51) Int. Cl.
*G01J 3/12* (2006.01)
*G01J 11/00* (2006.01)
*H04B 10/67* (2013.01)

(52) U.S. Cl.
CPC ................ *G01J 3/12* (2013.01); *G01J 11/00* (2013.01); *H04B 10/67* (2013.01)

(58) Field of Classification Search
CPC ...... G01J 11/00; G01J 3/12; G01J 2003/1213; G01J 2003/1286; G01J 3/0218; G01J 3/28;
(Continued)

(56) References Cited

U.S. PATENT DOCUMENTS 9,304,040 B2 * 4/2016 Yetzbacher ............ G01N 21/45
9,958,327 B2 * 5/2018 Shachaf ............... G01N 21/956
2011/0311223 A1 12/2011 Konishi et al.

FOREIGN PATENT DOCUMENTS

JP 2010-204308 9/2010

OTHER PUBLICATIONS

International Search Report (ISR) issued on Sep. 14, 2021 in International (PCT) Application No. PCT/JP2021/023553.
(Continued)

*Primary Examiner* — Tri T Ton
(74) *Attorney, Agent, or Firm* — Wenderoth, Lind & Ponack, L.L.P.

(57) ABSTRACT

An optical signal detection system includes: a nonlinear converter that nonlinearly converts a plurality of first optical signals into a plurality of second optical signals, and also a third optical signal into a fourth optical signal; a spectrometer that obtains each of a plurality of first spectral data items from a different one of the plurality of second optical signals, and also a third spectral data item from the fourth optical signal; and a detection device that detects the third optical signal and outputs a detection result. The detection device includes: an analyzer that performs sparse principal component analysis on the plurality of first spectral data items to generate a plurality of second spectral data items; and a detector that compares the third spectral data item with
(Continued)

each of the plurality of second spectral data items, and detects the third optical signal based on the result of the comparison.

10 Claims, 6 Drawing Sheets

(58) Field of Classification Search
CPC ............... H04B 10/67; H04B 10/0795; H04B 10/07953
See application file for complete search history.

(56) References Cited

OTHER PUBLICATIONS

Sadanori Konishi, "Introduction to Multivariate Analysis: Linear and Nonlinear Modeling", Iwanami Shoten, Jan. 2010, pp. 250-259 with partial English translation.

* cited by examiner

OPTICAL SIGNAL DETECTION SYSTEM, OPTICAL SIGNAL DETECTION DEVICE, AND OPTICAL SIGNAL DETECTION METHOD

TECHNICAL FIELD

The present invention relates to an optical signal detection system, an optical signal detection device, and an optical signal detection method that utilizes nonlinear optical effects to detect an optical signal.

BACKGROUND ART

There has conventionally been an optical signal detection technique of detecting, for instance, the temporal waveform, intensity, or amplitude and phase of an optical signal. For example, Patent Literature (PTL) 1 discloses a method of reconstructing the temporal waveforms of input optical signals having different intensities, without using an ultra-high-speed time gate or a reference light source, by performing a simulation of transmitting the input optical signals in a highly nonlinear optical fiber.

CITATION LIST

Patent Literature

[PTL 1] Japanese Unexamined Patent Application Publication No. 2010-204308

Non Patent Literature

[NPL 1] Sadanori Konishi, "Introduction to Multivariate Analysis: Linear and Nonlinear Modeling", Iwanami Shoten, January 2010, pp. 250-258

SUMMARY OF INVENTION

Technical Problem

Unfortunately, the conventional technique as described above requires much time to detect an optical signal since transmission simulations are demanded.

In view of this, the present invention provides an optical signal detection system, an optical signal detection device, and an optical signal detection method capable of detecting an optical signal with high speed using a simple configuration.

Solution to Problem

An optical detection system according to one aspect of the present invention includes: a nonlinear converter that nonlinearly converts a plurality of first optical signals into a plurality of second optical signals, and also a third optical signal into a fourth optical signal, where the plurality of first optical signals are predetermined and different from each other in at least one of temporal waveform, intensity, amplitude, or phase; a spectrometer that obtains each of a plurality of first spectral data items from a different one of the plurality of second optical signals, and also a third spectral data item from the fourth optical signal; and a detection device that detects the third optical signal and outputs a detection result. The detection device includes: an analyzer that performs sparse principal component analysis on the plurality of first spectral data items to generate a plurality of second spectral data items, where each of the plurality of second spectral data items has less frequency components than a corresponding one of the plurality of first spectral data items; and a detector that compares the third spectral data item with each of the plurality of second spectral data items, and detects the third optical signal based on a result of the comparison.

These generic or specific aspects may be implemented using a device, a method, an integrated circuit, a computer program, or a computer-readable recording medium such as a CD-ROM, or any combination thereof.

Advantageous Effects of Invention

The optical signal detection system according to one aspect of the present invention is capable of detecting an optical signal with high speed using a simple configuration.

DESCRIPTION OF EMBODIMENTS

Hereinafter, embodiments of the present invention will be described in detail with reference to the drawings.

Embodiments described below each show a generic or specific example of the present invention. The numerical values, shapes, materials, elements, arrangement and connection of the elements, steps, an order of the steps, etc., indicated in the following embodiments are mere examples, and therefore are not intended to limit the scope of the claims.

Moreover, the drawings are not necessarily accurate illustrations. Elements having substantially same configurations are assigned with like reference signs in the drawings, and overlapping description thereof may be omitted or simplified.

Embodiment

[1.1 Configuration of Optical Signal Detection System 10]

Figure 1:
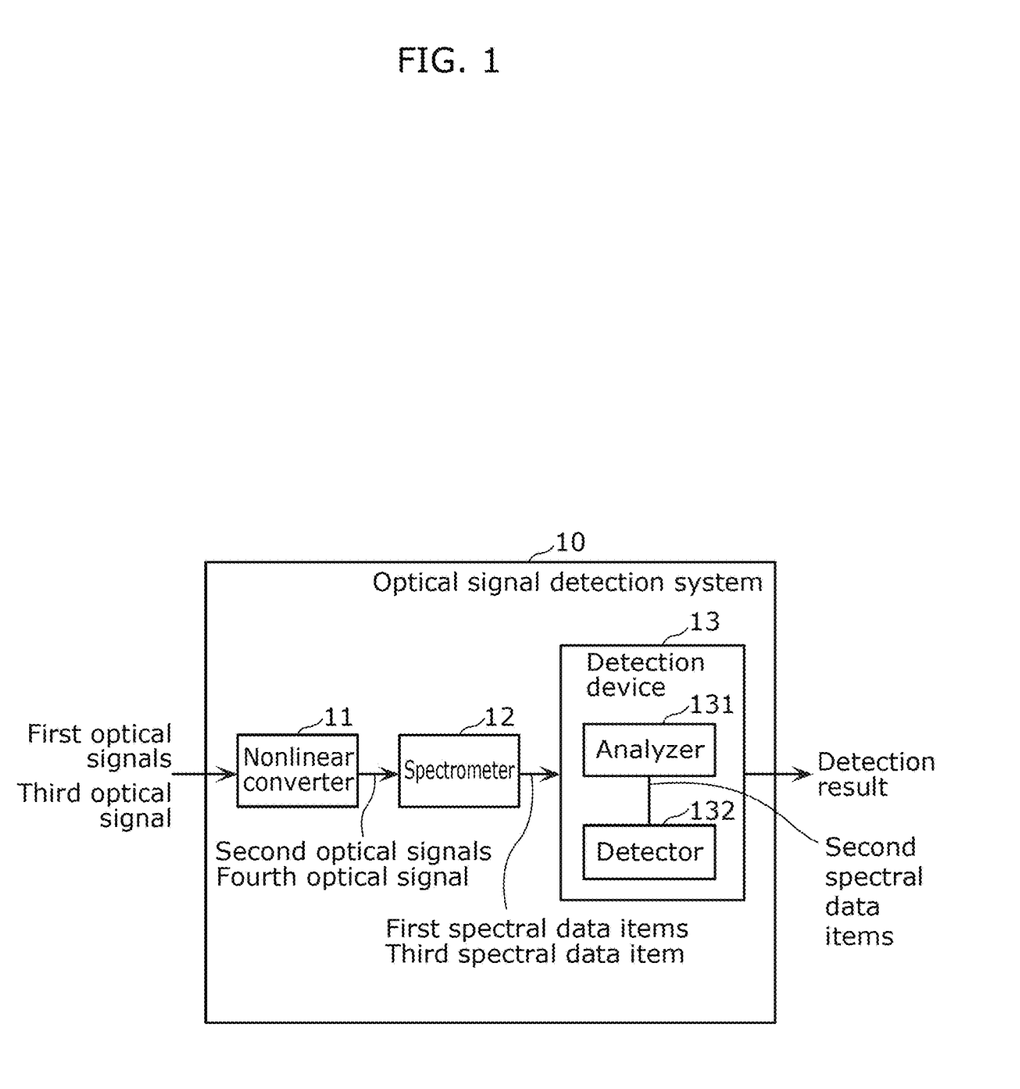
FIG. 1 is a block diagram illustrating the functional configuration of an optical signal detection system according to an embodiment.

First, the configuration of optical signal detection system 10 according to an embodiment will be described with reference to the drawings. FIG. 1 is a block diagram illustrating the functional configuration of optical signal detection system 10 according to the embodiment. Optical signal detection system 10 according to the present embodiment includes nonlinear converter 11, spectrometer 12, and detection device 13, as illustrated in FIG. 1.

Nonlinear converter 11 can nonlinearly convert an optical signal owing to nonlinear optical effects. Specifically, nonlinear converter 11 can nonlinearly map the property/properties (e.g., a temporal waveform, intensity, an amplitude, a phase, or any combination thereof) of the optical signal over a spectral space.

In general, it is not possible to apply linear multivariate analysis (e.g., sparse principal component analysis) to data that includes a nonlinear structure. Such data can be converted into data to which linear multivariate analysis is applicable by being mapped over a high dimensional space referred to as a feature space with the use of a nonlinear function (for example, see NPL 1).

Nonlinear converter 11 according to the present embodiment is equivalent to a physical implementation method for such data conversion to a high dimensional space with the use of a nonlinear function. In other words, by mapping the property/properties of an optical signal that includes a nonlinear structure over a spectral space (i.e., a high dimensional space), nonlinear converter 11 can convert the property/properties of the optical signal to which linear multivariate analysis is inapplicable into a spectrum which includes a plurality of frequency components and to which the linear multivariate analysis is applicable.

For example, a nonlinear optical medium can be used as nonlinear converter 11. More specifically, a nonlinear optical fiber or a nonlinear optical waveguide (e.g., a silicon waveguide) can be used as nonlinear converter 11, but nonlinear converter 11 is not limited to these examples.

In the present embodiment, nonlinear converter 11 nonlinearly converts a plurality of first optical signals into a plurality of second optical signals. In addition, nonlinear converter 11 nonlinearly converts a third optical signal into a fourth optical signal.

The plurality of first optical signals are predetermined optical signals having mutually different optical properties. For example, at least one of a temporal waveform, intensity, an amplitude, or a phase may be listed as an example of such optical properties. In this case, each of the plurality of first optical signals is different from any other first optical signal in at least one of temporal waveform, intensity, amplitude, or phase.

The third optical signal is an optical signal to be detected. In other words, the property/properties (e.g., a temporal waveform, intensity, an amplitude, a phase, or any combination thereof) of the third optical signal is/are unknown and to be detected by optical signal detection system 10.

Spectrometer 12 can obtain a spectral data item from an optical signal. For example, a spectrometer that uses a dispersive element can be used as spectrometer 12. As the dispersive element, a diffractive element or a prism can be used, for instance. Spectrometer 12 is not limited to a spectrometer that uses a dispersive element, and may be, for example, a spectrometer that uses an interferometer.

In the present embodiment, spectrometer 12 obtains each of a plurality of first spectral data items from a different one of a plurality of second optical signals. In addition, spectrometer 12 obtains a third spectral data item from a fourth optical signal.

Detection device 13 can detect an optical signal and output the detection result. Detecting an optical signal means detecting the optical property/properties (e.g., a temporal waveform, intensity, an amplitude, a phase, or any combination thereof) of the optical signal and/or detecting information corresponding to such a property/properties.

For example, a computer including a processor and memory can be used as detection device 13. In this case, the computer can function as detection device 13 when an instruction or a software program stored in the memory is executed by the processor. Alternatively, a dedicated electronic circuit, for instance, may be used as detection device 13.

As illustrated in FIG. 1, detection device 13 includes analyzer 131 and detector 132. Analyzer 131 performs sparse principal component analysis on a plurality of first spectral data items to generate a plurality of second spectral data items each having less frequency components than a corresponding one of the plurality of first spectral data items. The number of frequency components included in each of the plurality of second spectral data items is less than the number of frequency components included in each of the plurality of first spectral data items. For example, analyzer 131 performs sparse principal component analysis on a plurality of first spectral data items each including N frequency components (N is a natural number of 2 or greater), to generate a plurality of second spectral data items each including M frequency components (M is a natural number less than N). Each of the plurality of second spectral data items is stored, in the memory, in association with the property/properties (e.g., a temporal waveform, intensity, an amplitude, a phase, or any combination thereof) of a corresponding one of the plurality of first optical signals.

Sparse principal component analysis is statistical analysis that inputs a sparse structure to input variables and reduces the number of dimensions of data. In the sparse principal component analysis, a linear combination that includes only some of the input variables can be employed as a principal component.

Figure 2:
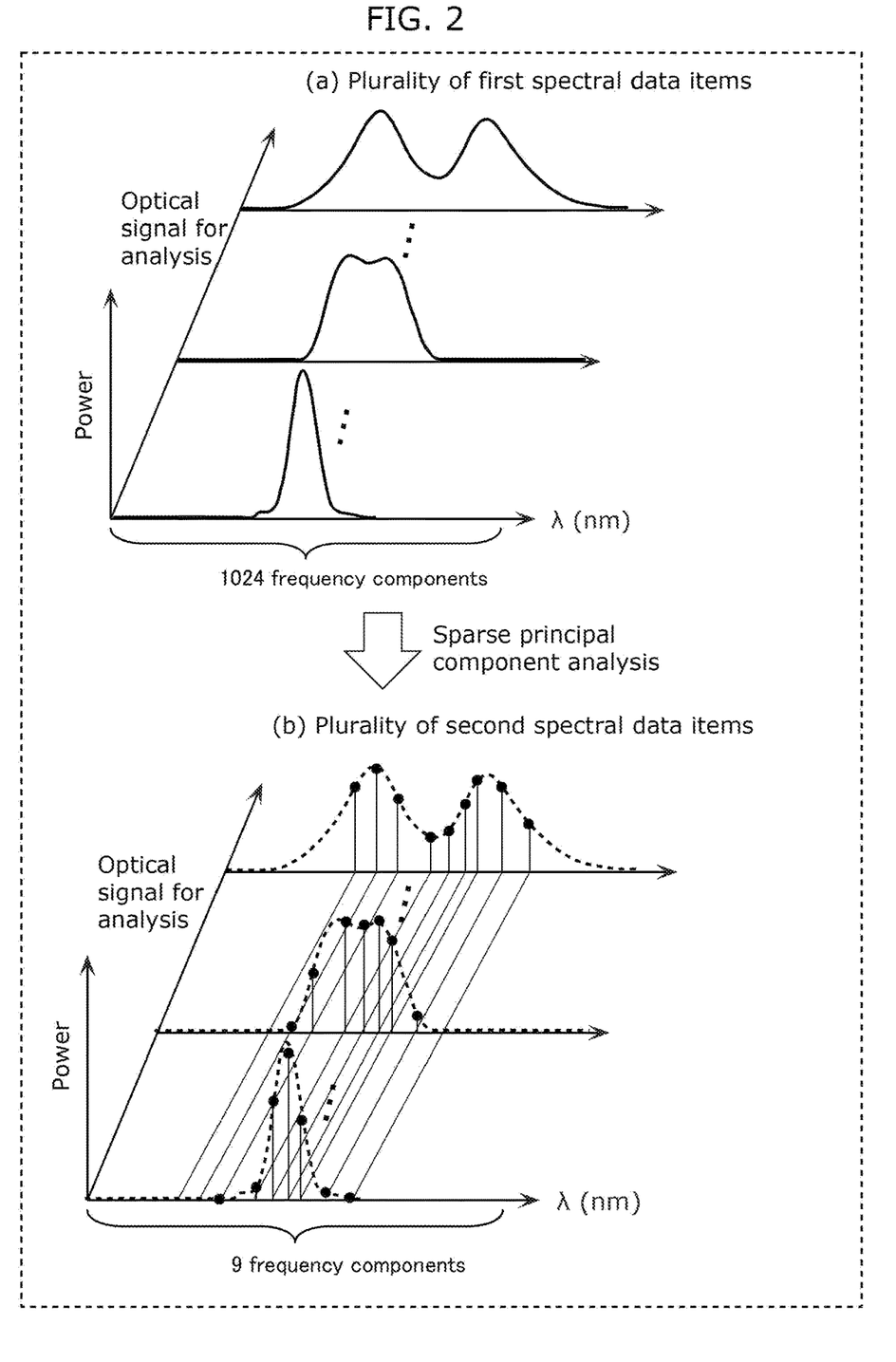
FIG. 2 is a diagram for explaining sparse principal component analysis according to the embodiment.

FIG. 2 is a diagram for explaining the sparse principal component analysis according to the embodiment. In FIG. 2, each of the line graphs shows a single spectral data item. In each of the line graphs, a horizontal axis presents a wavelength and a vertical axis presents a power value.

(a) in FIG. 2 illustrates a plurality of first spectral data items. Each of the plurality of first spectral data items indicates a different one of spectra of a plurality of second optical signals. Each of the plurality of first spectral data items has 1024 frequency components. In other words, each of the plurality of first spectral data items includes 1024 data points each being made up of a combination of a power value and a frequency. The frequencies of 1024 data points are common to the plurality of first spectral data items.

(b) in FIG. 2 illustrates a plurality of second spectral data items. The plurality of second spectral data items are generated from the plurality of first spectral data items through sparse principal component analysis, and differences among the spectra of the plurality of second optical signals can be presented with less frequency components than those presenting the plurality of first spectral data items. Each of the plurality of second spectral data items has 9 frequency components. In other words, each of the plurality of second spectral data items includes 9 data points each being made up of a combination of a power value and a frequency. The frequencies of 9 data points are common to the plurality of second spectral data items.

Detector 132 compares a third spectral data item with each of a plurality of second spectral data items, and detects the third optical signal based on the result of the comparison. Stated differently, detector 132 evaluates similarity or non-similarity between the third spectral data item and each of the plurality of second spectral data items, and detects the third optical signal based on the evaluation result.

For example, detector 132 compares the third spectral data item with each of the plurality of second spectral data items to search a second spectral data item similar to the third spectral data item. Detector 132 then detects the third optical signal based on a first optical signal corresponding to the searched second spectral data item.

Alternatively, detector 132 may compare the third spectral data item with each of the plurality of second spectral data items to determine whether a second spectral data item similar to the third spectral data item is present among the plurality of second spectral data items, for example. Detector 132 may then detect the third optical signal based on the determination result.

For such comparison between the third spectral data item and the second spectral data item, the sum of absolute difference (SAD) of frequency components between the third spectral data item and the second spectral data item can be used, for example. In this case, detector 132 can search a second spectral data item having the smallest SAD among the plurality of second spectral data items as a second spectral data item that is the most similar to the third spectral data item. When a second spectral data item having SAD smaller than a predetermined threshold is not included in the plurality of second spectral data items, detector 132 may determine that no second spectral data item similar to the third spectral data item is present.

The method of comparing with a second spectral data item is not limited to the above example. For example, the multiplicative inverse of SAD, a sum of squared difference (SSD), or the multiplicative inverse of SSD may be used instead of SAD.

[1.2 Processing of Optical Signal Detection System 10]

Processing of optical signal detection system 10 configured as described above will be described with reference to the drawings. Optical signal detection is divided into an analysis phase and a detection phase.

[1.2.1 Analysis Phase]

Figure 3:
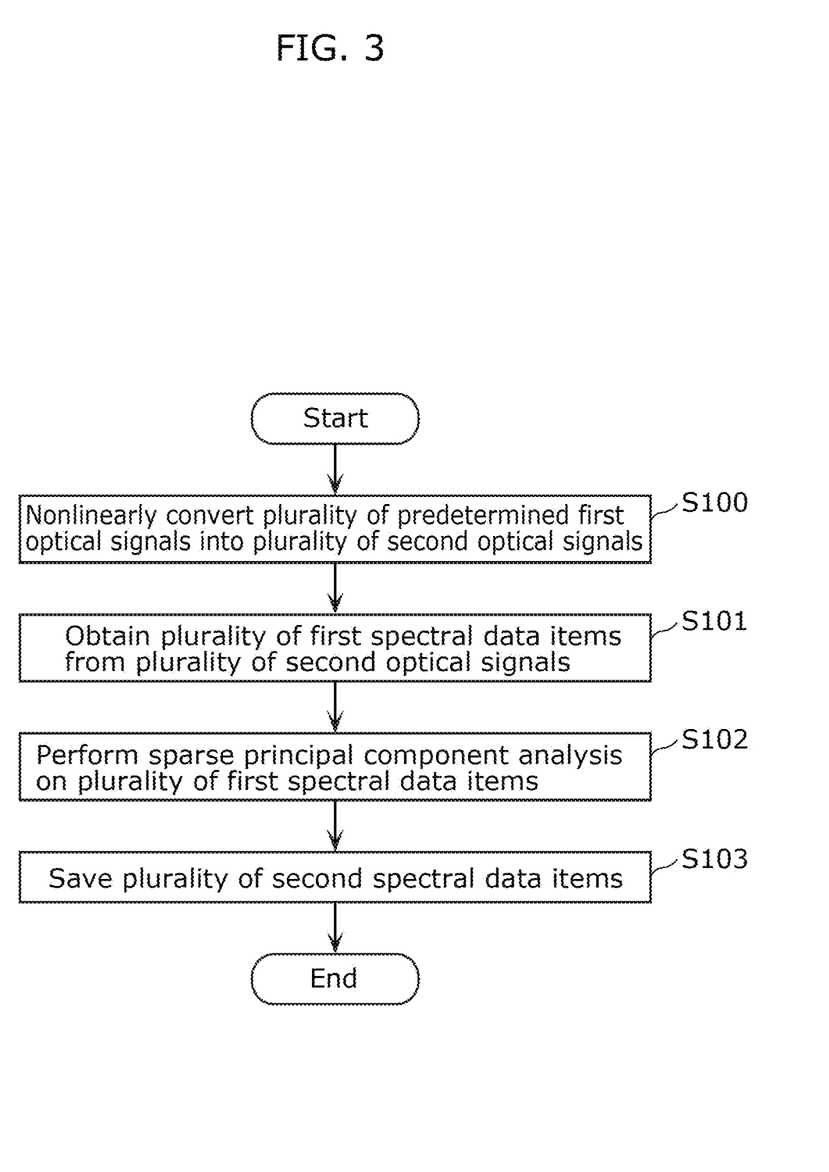
FIG. 3 is a flowchart illustrating an analysis phase process according to the embodiment.

First, an analysis phase will be described with reference to FIG. 3. FIG. 3 is a flowchart illustrating an analysis phase process according to the embodiment. The analysis phase is performed before a detection phase. The analysis phase, however, does not need to be performed for each detection phase.

First, nonlinear converter 11 nonlinearly converts a plurality of predetermined first optical signals into a plurality of second optical signals (S100). The plurality of second optical signals are transmitted to spectrometer 12.

Spectrometer 12 obtains a plurality of first spectral data items from the plurality of second optical signals (S101). Each of the plurality of first spectral data items includes relatively many frequency components. In other words, spectrometer 12 is required to measure power values at relatively many frequencies. The obtained first spectral data items are transmitted to detection device 13.

Analyzer 131 in detection device 13 performs sparse principal component analysis on the plurality of first spectral data items (S102). With this, a plurality of second spectral data items each including less frequency components than a corresponding one of the plurality of first spectral data items are generated.

Analyzer 131 in detection device 13 saves the plurality of second spectral data items in association with the plurality of first optical signals (S103). For example, analyzer 131 stores a combination of (i) each of the plurality of second spectral data items and (ii) the temporal waveform, intensity, or amplitude and phase of a corresponding one of the plurality of first optical signals into the internal storage of detection device 13 (not shown in the drawings) or an external storage connected to detection device 13 (not shown in the drawings).

[1.2.2 Detection Phase]

Figure 4:
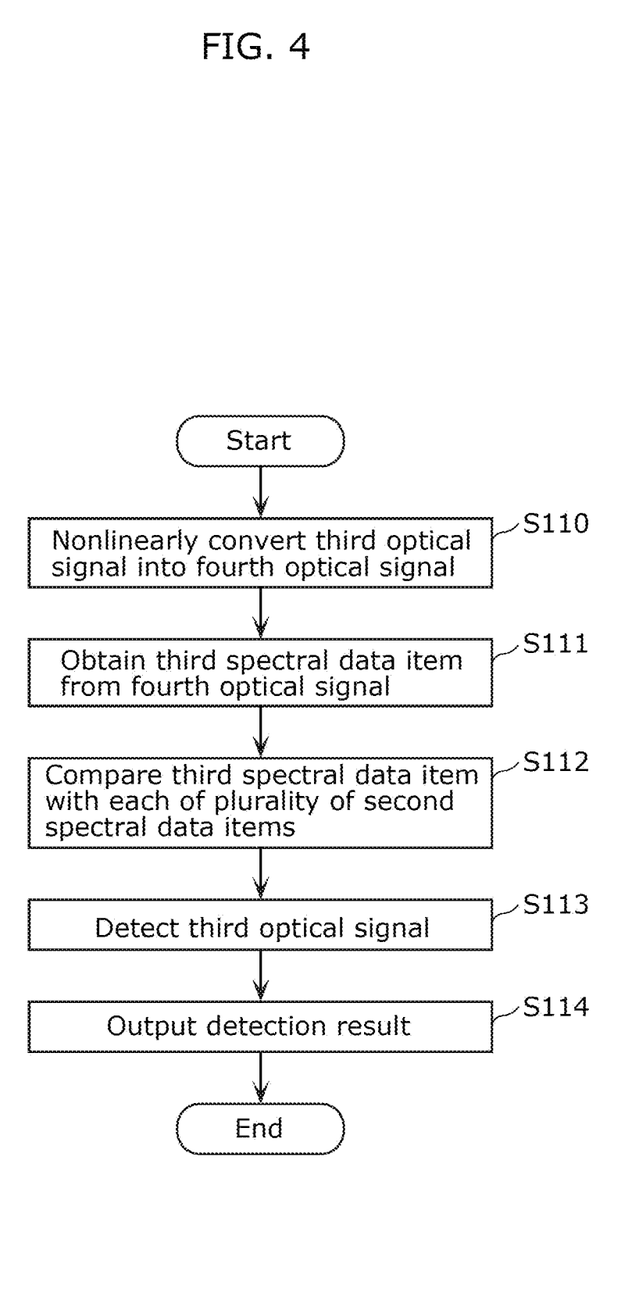
FIG. 4 is a flowchart illustrating a detection phase process according to the embodiment.

Next, a detection phase performed after an analysis phase will be described with reference to FIG. 4. FIG. 4 is a flowchart illustrating a detection phase process according to the embodiment.

First, nonlinear converter 11 nonlinearly converts a third optical signal into a fourth optical signal (S110). The fourth optical signal is transmitted to spectrometer 12.

Spectrometer 12 obtains a third spectral data item from the fourth optical signal (S111). The third spectral data item includes at least the same frequency components as those included in each of the plurality of second spectral data items. In other words, spectrometer 12 should measure power values at relatively less frequencies. The obtained third spectral data item is transmitted to detection device 13.

Detector 132 in detection device 13 compares the third spectral data item with each of the plurality of second spectral data items saved in the analysis phase (S112), and detects the third optical signal based on the comparison result (S113). Detector 132 then outputs the detection result (S114). Specifically, detector 132 outputs the detection result to, for example, a storage, a display, or an information terminal.

[1.3 Advantageous Effects, Etc.]

As described above, optical signal detection system 10 according to the present embodiment includes: nonlinear converter 11 that nonlinearly converts a plurality of first optical signals into a plurality of second optical signals, and also a third optical signal into a fourth optical signal, where the plurality of first optical signals are predetermined and different from each other in at least one of temporal waveform, intensity, amplitude, or phase; spectrometer 12 that obtains each of a plurality of first spectral data items from a different one of the plurality of second optical signals, and also a third spectral data item from the fourth optical signal; and detection device 13 that detects the third optical signal and outputs the detection result. Detection device 13 includes: analyzer 131 that performs sparse principal component analysis on the plurality of first spectral data items to generate a plurality of second spectral data items, where each of the plurality of second spectral data items has less frequency components than a corresponding one of the plurality of first spectral data items; and detector 132 that compares the third spectral data item with each of the plurality of second spectral data items, and detects the third optical signal based on the result of the comparison.

According to the above configuration, with the use of the spectrum of a fourth optical signal into which a third optical signal is nonlinearly converted, it is possible to detect the third optical signal. In other words, it is possible to detect the third optical signal utilizing a nonlinear optical fiber or a nonlinear optical waveguide, thereby detecting an optical signal using a simple configuration. In addition, it is possible to generate a plurality of second spectral data items that can represent, with less frequency components, differences among a plurality of first optical signals. Accordingly, it is possible to speed up a spectral data comparison process.

For example, in optical signal detection system 10 according to the present embodiment, detector 132 may: compare the third spectral data item with each of the plurality of second spectral data items to search a second spectral data item similar to the third spectral data item; and detect the third optical signal based on a first optical signal corresponding to the searched second spectral data item.

With this, it is possible to search a second spectral data item similar to a third spectral data item, thereby enabling the search of nonlinear conversion from a first optical signal to a second optical signal which is similar to nonlinear conversion from a third optical signal to a fourth optical signal. Accordingly, it is possible to utilize a first optical signal corresponding to a searched second spectral data item for the detection of a third optical signal, and this enables more useful detection of a third optical signal.

For example, in optical signal detection system 10 according to the present embodiment, detector 132 may: compare the third spectral data item with each of the plurality of second spectral data items to determine whether a second spectral data item similar to the third spectral data item is present among the plurality of second spectral data items; and detect the third optical signal based on the result of the determination.

With this, it is possible to utilize presence or absence of a second spectral data item similar to a third spectral data item for the detection of a third optical signal, and this enables more useful detection of a third optical signal.

Detection device 13 according to the present embodiment detects an optical signal and outputs the detection result. Detection device 13 includes: analyzer 131 that performs sparse principal component analysis on a plurality of first spectral data items to generate a plurality of second spectral data items, where each of the plurality of second spectral data items has less frequency components than a corresponding one of the plurality of first spectral data items, each of the plurality of first spectral data items is obtained from a different one of a plurality of second optical signals into which a plurality of first optical signals are nonlinearly converted, and the plurality of first optical signals are predetermined and different from each other at least in temporal waveform, intensity, amplitude, or phase; and detector 132 that (i) compares a third spectral data item with each of the plurality of second spectral data items, where the third spectral data item is obtained from a fourth optical signal into which a third optical signal is nonlinearly converted, and (ii) detects the third optical signal based on the result of the comparison.

With the above configuration, it is possible to obtain the same effects as those produced by optical signal detection system 10 described above.

An optical signal detection method according to the present embodiment includes: nonlinearly converting a plurality of first optical signals into a plurality of second optical signals, where the plurality of first optical signals are predetermined and different from each other in at least one of temporal waveform, intensity, amplitude, or phase (S100); obtaining each of a plurality of first spectral data items from a different one of the plurality of second optical signals (S101); performing sparse principal component analysis on the plurality of first spectral data items to generate a plurality of second spectral data items, where each of the plurality of second spectral data items has less frequency components than a corresponding one of the plurality of first spectral data items (S102); nonlinearly converting a third optical signal into a fourth optical signal (S110); obtaining a third spectral data item from the fourth optical signal (S111); comparing the third spectral data item with each of the plurality of second spectral data items (S112); and detecting the third optical signal based on the result of the comparing (S113); and outputting a detection result (S114).

With this, it is possible to obtain the same effects as those produced by optical signal detection system 10 described above.

As described above, the number of frequency components required for a spectral data item is different between a detection phase and an analysis phase. In other words, the number of frequency components required for a first spectral data item is greater than the number of frequency components required for a third spectral data item. Accordingly, spectrometer 12 used in the detection phase may be different from spectrometer 12 used in the analysis phase.

Example 1

Next, Example 1 will be described. In the present example, optical signal detection system 10 according to the above embodiment is applied to waveform reconstruction techniques. The following describes processing performed by optical signal detection system 10 according to the present example.

[2.1 Analysis Phase]

Nonlinear converter 11 nonlinearly converts a plurality of predetermined first optical signals into a plurality of second optical signals. In the present example, optical pulse signals having different temporal waveforms are used as the plurality of predetermined first optical signals. Each of the plurality of second optical signals has a spectrum dependent on the temporal waveform of a corresponding one of the plurality of first optical signals. It is preferable that the plurality of second optical signals have mutually different spectra.

Spectrometer 12 obtains a plurality of first spectral data items from the plurality of second optical signals. The plurality of first spectral data items can represent differences in temporal waveform among the plurality of first optical signals.

Analyzer 131 in detection device 13 performs sparce principal analysis on the plurality of first spectral data items thus obtained, to generate and save a plurality of second spectral data items. With this, the plurality of first spectral data items are converted into the plurality of second spectral data items. Through the spectral data conversion, the number of frequency components included in each of the spectral data items is reduced. For example, a first spectral data item including 256 frequency components is converted into a second spectral data item including 9 frequency components.

[2.2 Detection Phase]

Nonlinear converter 11 nonlinearly converts a third optical signal into a fourth optical signal. The third optical signal is an optical pulse signal having an unknown temporal waveform. Subsequently, spectrometer 12 obtains a third spectral data item from the fourth optical signal. The third spectral data item is dependent on the temporal waveform of the third optical signal. The number of frequency components included in the third spectral data item matches the number of frequency components included in each of the plurality of second spectral data items.

Detector 132 in detection device 13 compares the third spectral data item thus obtained with each of the plurality of second spectral data items, to search a second spectral data item similar to the third spectral data item. Detector 132 then detects the temporal waveform of a first optical signal corresponding to the searched second spectral data item as the temporal waveform of the third optical signal. With this, the temporal waveform of the third optical signal is reconstructed.

[2.3 Advantageous Effects, Etc.]

As described above, in optical signal detection system 10 according to the present example: a plurality of first optical signals have different temporal waveforms; and detector 132 compares a third spectral data item with each of a plurality of second spectral data items to search a second spectral data item similar to the third spectral data item, and detects the temporal waveform of a first optical signal corresponding to the searched second spectral data item as the temporal waveform of a third optical signal.

With this, optical signal detection system 10 can be applied to optical pulse signal waveform reconstruction techniques. In the application, it is possible to reconstruct the temporal waveform of an optical pulse signal using a relatively simple configuration and without using an ultra-high-speed time gate or a reference light source. In addition, owing to frequency component reduction effects obtained through sparse principal component analysis, higher-speed waveform reconstruction can be achieved.

Example 2

Next, Example 2 will be described. In the present example, optical signal detection system 10 according to the above embodiment is applied to analog/digital conversion optical techniques. The following describes processing of optical signal detection system 10 according to the present example.

[3.1 Analysis Phase]

Nonlinear converter 11 nonlinearly converts a plurality of predetermined first optical signals into a plurality of second optical signals. In the present example, optical pulse signals having different intensities each assigned to a different one of digital data items are used as the plurality of predetermined first optical signals. Such first optical signals can indicate a plurality of digital data items by means of intensities. For example, a first optical signal having a first intensity indicates a first digital data item, and a first optical signal having a second intensity different from the first intensity indicates a second digital data item different from the first digital data item. Each of the plurality of second optical signals has a spectrum dependent on the intensity of a corresponding one of the plurality of first optical signals. It is preferable that the plurality of second optical signals have mutually different spectra.

Spectrometer 12 obtains a plurality of first spectral data items from the plurality of second optical signals. The plurality of first spectral data items can represent differences in intensity among the plurality of first optical signals.

Analyzer 131 in detection device 13 performs sparse principal analysis on the plurality of first spectral data items thus obtained, to generate and save a plurality of second spectral data items. With this, the plurality of first spectral data items are converted into the plurality of second spectral data items. Through the spectral data conversion, the number of frequency components included in each of the spectral data items is reduced.

[3.2 Detection Phase]

Nonlinear converter 11 nonlinearly converts a third optical signal into a fourth optical signal. The third optical signal is an optical pulse signal having an unknown intensity. Subsequently, spectrometer 12 obtains a third spectral data item from the fourth optical signal. The third spectral data item is dependent on the intensity of the third optical signal. The number of frequency components included in the third spectral data item matches the number of frequency components included in each of the plurality of second spectral data items.

Detector 132 in detection device 13 compares the third spectral data item thus obtained with each of the plurality of second spectral data items, to search a second spectral data item similar to the third spectral data item. Detector 132 then detects the intensity of a first optical signal corresponding to the searched second spectral data item as the intensity of the third optical signal. Accordingly, it is possible to detect the digital data item indicated by the third optical signal.

Figure 5:
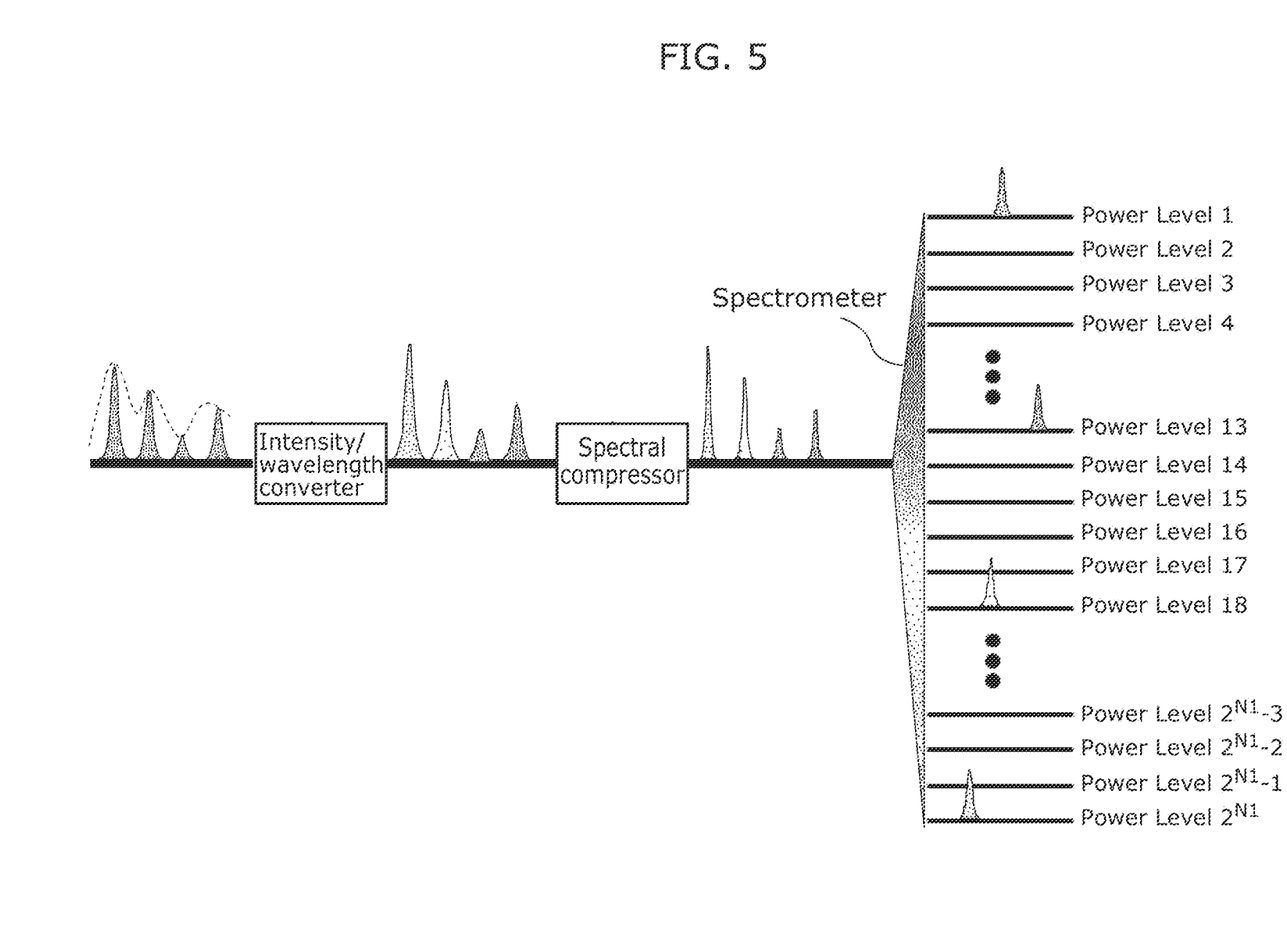
FIG. 5 is a diagram illustrating an optical analog/digital conversion system according to a conventional technique.
Figure 6:
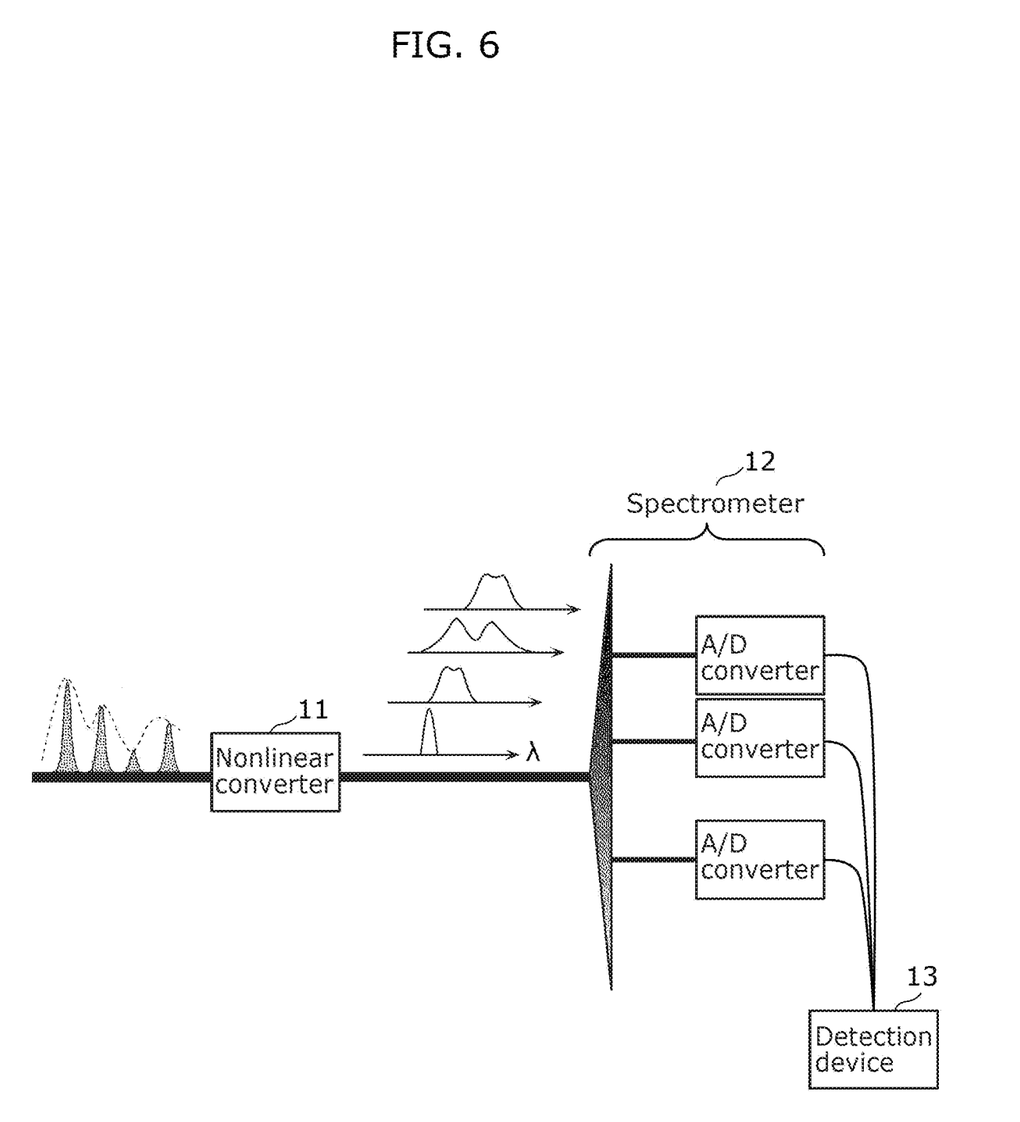
FIG. 6 is a diagram illustrating an application example of applying the optical signal detection system according to the embodiment to optical analog/digital conversion.

The following describes an application example of applying optical signal detection system 10 according to the present example to analog/digital conversion, while comparing with an analog/digital conversion system according to a conventional technique. FIG. 5 is a diagram illustrating an analog/digital conversion system according to the conventional technique. FIG. 6 is a diagram illustrating an application example of applying optical signal detection system 10 according to the embodiment to analog/digital conversion. FIG. 5 and FIG. 6 each illustrate an example of detecting a plurality of third optical signals having different intensities (that are unknown) each assigned to a different one of digital data items.

In the conventional technique illustrated in FIG. 5, a third optical signal indicates $N_1$-bit digital data by means of an intensity change at $2^{N_1}$ levels. $N_1$ is a natural number. In FIG. 5, a plurality of third optical signals are converted, by an intensity/wavelength converter, into optical signals each having a wavelength corresponding to the intensity of a corresponding one of the plurality of third optical signals, and spectra of the optical signals are compressed by a spectral compressor. By detecting, for each of the optical signals thus subjected to the intensity/wavelength conversion and the spectral compression, presence or absence of each of frequency components in $M_1$ frequencies using, for example, $M_1$ number of A/D converters each with 2-bit resolution, it is possible to obtain digital data corresponding to the intensity of a corresponding one of the plurality of third optical signals. $M_1$ is equal to $2^{N_1}$. Accordingly, $N_1$-bit analog/digital conversion is achieved.

In the application example illustrated in FIG. 6, a third optical signal indicates $N_2$-bit digital data by means of an intensity change of $2^{N_2}$ levels. $N_2$ is a natural number greater than $N_1$. In FIG. 6, a plurality of third optical signals are nonlinearly converted in order into a plurality of fourth optical signals by nonlinear converter 11. With the use of $M_2$ number of A/D converters, spectrometer 12 obtains, from each of the plurality of fourth optical signals, a third spectral data item that includes $M_2$ frequency components. $M_2$ is a natural number less than $M_1$ and $2^{N_2}$. Each of the $M_2$ number of A/D converters measures the value of a corresponding one of the frequency components (power values) with $L_2$-bit resolution lower than $N_2$-bit resolution. In other words, spectrometer 12 obtains the value of each of the frequency components with lower resolution than resolution for the intensities of a plurality of first optical signals. Each of the plurality of third spectral data items thus obtained is compared with each of a plurality of second spectral data items previously saved by detection device 13, and the intensity of each of the plurality of third optical signals is detected based on the comparison result.

As described above, it is possible to achieve analog/digital conversion using A/D converters that is less in number than resolution for the intensity change of the third optical signal ($M_2 < M_1$) in FIG. 6. In addition, it is possible, with the use of nonlinear converter 11, to achieve analog/digital conversion with resolution higher than that applied in the conventional technique that uses an intensity/wavelength converter and a spectral compressor ($N_2 > N_1$).

[3.3 Advantageous Effects, Etc.]

As described above, in optical signal detection system 10 according to the present example: a plurality of first optical signals have different intensities each assigned to a different one of digital data items; and detector 132 compares a third spectral data item with each of a plurality of second spectral data items to search a second spectral data item similar to the third spectral data item, and detects the intensity of a first optical signal corresponding to the searched second spectral data item as the intensity of a third optical signal.

With this, optical signal detection system 10 can be applied to analog/digital conversion optical techniques. In the application, it is unnecessary to perform intensity/wavelength conversion and spectral compression, and this enables analog/digital conversion with higher resolution. In addition, owing to frequency component reduction effects obtained through sparse principal component analysis, higher-speed analog/digital conversion can be achieved.

For example, in optical signal detection system 10 according to the present example, spectrometer 12 may obtain the value of each of frequency components with lower resolution than resolution for the intensities of the plurality of first optical signals.

With this, it is possible to detect an intensity change in optical signals with higher resolution using a change in frequency components with lower resolution, thereby achieving highly accurate signal detection using hardware with low accuracy.

Example 3

Next, Example 3 will be described. In the present example, optical signal detection system 10 according to the above embodiment is applied to digital coherent reception techniques. The following describes processing of optical signal detection system 10 according to the present example.

[4.1 Analysis Phase]

Nonlinear converter 11 nonlinearly converts a plurality of predetermined first optical signals into a plurality of second optical signals. In the present example, optical signals each of which is modulated by a different one of combinations each being made up of an amplitude and a phase and being assigned to a different one of digital data items are used as the plurality of predetermined first optical signals. Quadrature amplitude modulation (QAM), for example, can be used as a modulation method, but the modulation method is not limited to this. Such first optical signals can indicate a plurality of digital data items using combinations each being made up of an amplitude and a phase. For example, a first optical signal having a first amplitude and a first phase indicates a first digital data item, and a first optical signal having the first phase and a second amplitude different from the first amplitude indicates a second digital data item different from the first digital data item. Each of the plurality of second optical signals has a spectrum dependent on the combination of an amplitude and a phase of a corresponding one of the plurality of first optical signals. It is preferable that the plurality of second optical signals have mutually different spectra.

Spectrometer 12 obtains a plurality of first spectral data items from the plurality of second optical signals. In this case, the plurality of first spectral data items can represent differences in combination made up of an amplitude and a phase among the plurality of first optical signals.

Analyzer 131 in detection device 13 performs sparse principal component analysis on the plurality of first spectral data items thus obtained, to generate and save a plurality of second spectral data items. With this, the plurality of first spectral data items are converted into the plurality of second spectral data items. Through the spectral data conversion, the number of frequency components included in each of the spectral data items is reduced.

[4.2 Detection Phase]

Nonlinear converter 11 nonlinearly converts a third optical signal into a fourth optical signal. The third optical signal is an optical signal having an unknown combination of an amplitude and a phase. Subsequently, spectrometer 12 obtains a third spectral data item from the fourth optical signal. The third spectral data item depends on the combination of an amplitude and a phase of the third optical signal. Moreover, the number of frequency components included in the third spectral data item matches the number of frequency components included in each of the plurality of second spectral data items.

Detector 132 in detection device 13 compares the third spectral data item thus obtained with each of the plurality of second spectral data items, to search a second spectral data item similar to the third spectral data item. Detector 132 then detects the combination of an amplitude and a phase of a first optical signal corresponding to the searched second spectral data item as the combination of an amplitude and a phase of the third optical signal. Accordingly, it is possible to detect the digital data item indicated by the third optical signal.

[4.3 Advantageous Effects, Etc.]

As described above, in optical signal detection system 10 according to the present example: each of a plurality of first optical signals is modulated by a different one of combinations, each being made up of an amplitude and a phase and being assigned to a different one of digital data items; and detector 132 may compare the third spectral data item with each of the plurality of second spectral data items to search a second spectral data item similar to the third spectral data item, and may detect, as the combination of an amplitude and a phase of the third optical signal, the combination of an amplitude and a phase of a first optical signal corresponding to the searched second spectral data item.

With this, optical signal detection system 10 can be applied to digital coherent reception techniques. By utilizing nonlinear conversion in the application, it is possible to increase the number of combinations each being made up of an amplitude and a phase, and this enables higher-speed digital data transmission. When QAM is utilized as a modulation method, for example, higher-order QAM can be utilized. Moreover, a process of causing an optical signal and a laser light to interfere with each other, to detect I components and Q components, for instance, may be omitted. Furthermore, owing to frequency component reduction effects obtained through sparse principal component analysis, higher-speed demodulation can be achieved.

Example 4

Next, Example 4 will be described. In the present example, optical signal detection system 10 according to the above embodiment is applied to abnormal state detection. The following describes processing of optical signal detection system 10 according to the present example.

[5.1 Analysis Phase]

Nonlinear converter 11 nonlinearly converts a plurality of predetermined first optical signals into a plurality of second optical signals. In the present example, optical signals each indicating a normal state are used as the plurality of predetermined first optical signals. For example, optical signals that are dependent on the state of a target (e.g., a light source or infrastructure facilities) and are output when the target is in a normal state are used as the plurality of predetermined first optical signals. In this case, the plurality of predetermined first optical signals do not include any optical signal that is output when the target is in an abnormal state.

Spectrometer 12 obtains a plurality of first spectral data items from the plurality of second optical signals. The plurality of first spectral data items can represent differences among the plurality of first optical signals.

Analyzer 131 in detection device 13 performs sparse principal component analysis on the plurality of first spectral data items thus obtained, to generate and save a plurality of second spectral data items. With this, the plurality of first spectral data items are converted into the plurality of second spectral data items. Through the spectral data conversion, the number of frequency components included in each of the spectral data items is reduced.

[5.2 Detection Phase]

Nonlinear converter 11 nonlinearly converts a third optical signal into a fourth optical signal. The third optical signal is an optical signal indicating an unknown state. Subsequently, spectrometer 12 obtains a third spectral data item from the fourth optical signal. The third spectral data item depends on the third optical signal. The number of frequency components included in the third spectral data item matches the number of frequency components included in each of the plurality of second spectral data items.

Detector 132 in detection device 13 compares the third spectral data item thus obtained with each of the plurality of second spectral data items, to determine whether a second spectral data item similar to the third spectral data item is present among the plurality of second spectral data items. When it is determined that no such second spectral data item is present, detector 132 detects the third optical signal as an optical signal indicating an abnormal state. When it is determined that such second spectral data item is present, detector 132 detects the third optical signal as an optical signal indicating a normal state.

[5.3 Advantageous Effects, Etc.]

As described above, in optical signal detection system 10 according to the present example: each of a plurality of first optical signals represents an optical signal indicating a normal state; and detector 132 compares a third spectral data item with each of a plurality of second spectral data items to determine whether a second spectral data item similar to the third spectral data item is present among the plurality of second spectral data items, and when it is determined that no such second spectral data is present, detects a third optical signal as an optical signal indicating an abnormal state.

With this, optical signal detection system 10 can be applied to abnormal state detection techniques. By utilizing nonlinear conversion in the application, it is possible to reduce the false detection of an abnormal state. In addition, owing to frequency component reduction effects obtained through sparse principal component analysis, less-loaded and/or higher-speed detection can be achieved.

Other Embodiments

Although an optical signal detection system according to one or more aspects of the present invention has been described above based on an embodiment and examples, the present invention is not limited to these embodiment and examples. The scope of the one or more aspects of the present invention may encompass various modifications that may be conceived by those skilled in the art to the embodiment, and embodiments achieved by combining elements from different embodiments, so long as they do not depart from the essence of the present disclosure.

For example, detection device 13 executes an analysis phase in the above embodiment, but the present invention is not limited to this example. The analysis phase may be performed by, for example, other device different from detection device 13. In this case, detection device 13 may obtain, from other device, information in which each of a plurality of second spectral data items is associated with the feature of a corresponding one of a plurality of first optical signals, and store the information in a storage. In this case, detection device 13 need not include analyzer 131.

Industrial Applicability

The present invention can be utilized for, for instance, optical signal waveform reconstruction techniques, analog/digital conversion optical techniques, and digital coherent reception techniques.

REFERENCE SIGNS LIST 10 optical signal detection system
11 nonlinear converter
12 spectrometer
13 detection device
131 analyzer
132 detector

The invention claimed is:

1. An optical signal detection system comprising:
a nonlinear converter that nonlinearly converts a plurality of first optical signals into a plurality of second optical signals, and also a third optical signal into a fourth optical signal, the plurality of first optical signals being predetermined and different from each other in at least one of temporal waveform, intensity, amplitude, or phase;
a spectrometer that obtains each of a plurality of first spectral data items from a different one of the plurality of second optical signals, and also a third spectral data item from the fourth optical signal; and
a detection device that detects the third optical signal and outputs a detection result, wherein
the detection device includes:
an analyzer that performs sparse principal component analysis on the plurality of first spectral data items to generate a plurality of second spectral data items, each of the plurality of second spectral data items having less frequency components than a corresponding one of the plurality of first spectral data items; and
a detector that compares the third spectral data item with each of the plurality of second spectral data items, and detects the third optical signal based on a result of the comparison.

2. The optical signal detection system according to claim 1, wherein
the detector:
compares the third spectral data item with each of the plurality of second spectral data items to search a second spectral data item similar to the third spectral data item; and
detects the third optical signal based on a first optical signal corresponding to the searched second spectral data item.

3. The optical signal detection system according to claim 2, wherein
the plurality of first optical signals have different temporal waveforms, and the detector detects a temporal waveform of the first optical signal corresponding to the searched second spectral data item as a temporal waveform of the third optical signal.

4. The optical signal detection system according to claim 2, wherein
the plurality of first optical signals have different intensities each being assigned to a different one of digital data items, and
the detector detects an intensity of the first optical signal corresponding to the searched second spectral data item as an intensity of the third optical signal.

5. The optical signal detection system according to claim 4, wherein
the spectrometer obtains a value of each of frequency components with lower resolution than resolution for the intensities of the plurality of first optical signals.

6. The optical signal detection system according to claim 2, wherein
the plurality of first optical signals are each modulated by a different one of combinations, each of the combinations being made up of an amplitude and a phase and being assigned to a different one of digital data items, and
the detector detects a combination of an amplitude and a phase of the first optical signal corresponding to the searched second spectral data item as a combination of an amplitude and a phase of the third optical signal.

7. The optical signal detection system according to claim 1, wherein
the detector:
compares the third spectral data item with each of the plurality of second spectral data items to determine whether a second spectral data item similar to the third spectral data item is present among the plurality of second spectral data items; and
detects the third optical signal based on a result of the determination.

8. The optical signal detection system according to claim 7, wherein
each of the plurality of first optical signals represents an optical signal indicating a normal state, and
when it is determined that no second spectral data item similar to the third spectral data item is present, the detector detects the third optical signal as an optical signal indicating an abnormal state.

9. An optical signal detection device that detects an optical signal and outputs a detection result, the optical signal detection device comprising:
an analyzer that performs sparse principal component analysis on a plurality of first spectral data items to generate a plurality of second spectral data items, each of the plurality of second spectral data items having less frequency components than a corresponding one of the plurality of first spectral data items, each of the plurality of first spectral data items being obtained from a different one of a plurality of second optical signals into which a plurality of first optical signals are nonlinearly converted, the plurality of first optical signals being predetermined and different from each other at least in temporal waveform, intensity, amplitude, or phase; and
a detector that (i) compares a third spectral data item with each of the plurality of second spectral data items, the third spectral data item being obtained from a fourth optical signal into which a third optical signal is nonlinearly converted, and (ii) detects the third optical signal based on a result of the comparison.

10. An optical signal detection method comprising:
nonlinearly converting a plurality of first optical signals into a plurality of second optical signals, the plurality of first optical signals being predetermined and different from each other in at least one of temporal waveform, intensity, amplitude, or phase;
obtaining each of a plurality of first spectral data items from a different one of the plurality of second optical signals;
performing sparse principal component analysis on the plurality of first spectral data items to generate a plurality of second spectral data items, each of the plurality of second spectral data items having less frequency components than a corresponding one of the plurality of first spectral data items;
nonlinearly converting a third optical signal into a fourth optical signal;
obtaining a third spectral data item from the fourth optical signal;
comparing the third spectral data item with each of the plurality of second spectral data items;
detecting the third optical signal based on a result of the comparing; and
outputting a detection result.

* * * * *